United States Patent [19]

Wang

[11] Patent Number: 5,886,059

[45] Date of Patent: Mar. 23, 1999

[54] HIGHLY ASYMMETRIC POLYETHERSULFONE FILTRATION MEMBRANES

[75] Inventor: I-fan Wang, San Diego, Calif.

[73] Assignee: Memtec America Corporation, South Windsor, Australia

[21] Appl. No.: 889,418

[22] Filed: Jul. 8, 1997

[51] Int. Cl.[6] .............................. C08J 9/28; B01D 39/00; B01D 39/14
[52] U.S. Cl. ....................... 521/64; 210/500.41; 210/1; 264/41; 521/180; 521/189
[58] Field of Search ............................ 521/64, 180, 189; 210/500.41

[56] References Cited

U.S. PATENT DOCUMENTS

| | | | |
|---|---|---|---|
| 4,629,563 | 12/1986 | Wrasidio | 210/500.34 |
| 4,774,039 | 9/1988 | Wrasidio | 264/41 |
| 4,840,733 | 6/1989 | Sasaki | 210/500.41 |
| 4,933,081 | 6/1990 | Sasaki | 210/490 |
| 4,968,733 | 11/1990 | Muller et al. | 521/64 |
| 5,013,767 | 5/1991 | Malon et al. | 521/64 |
| 5,444,097 | 8/1995 | Tkacik | 521/61 |
| 5,708,040 | 1/1998 | Hong et al. | 521/64 |
| B1 4,629,563 | 6/1997 | Wrasidio | 210/500.34 |

*Primary Examiner*—Morton Foelak
*Attorney, Agent, or Firm*—Knobbe, Martens Olson & Bear, LLP

[57] ABSTRACT

Highly asymmetric polyethersulfone membranes prepared from a stable, clear, homogeneous solution or stable colloidal dispersion of polyethersulfone are described. The membranes have a porous skin possessing a high density of skin pores with an average diameter of from about 0.001 micron to about 20 microns. In addition, the membrane has a porous support with an asymmetric region of gradually increasing pore diameters so that the opposite face of the membrane has an average pore diameter that is from about 50 to about 10,000 times the diameter of the skin pores.

22 Claims, 8 Drawing Sheets

Figure 1
1a. Skin Surface@Magnification = 5,000 X
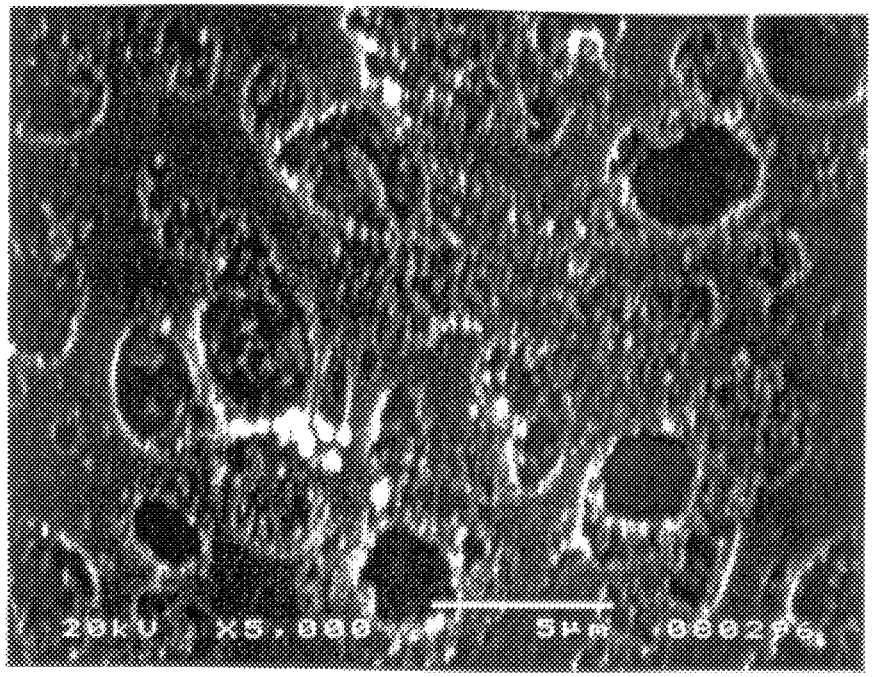
1b. Cross-section@Magnification = 500 X
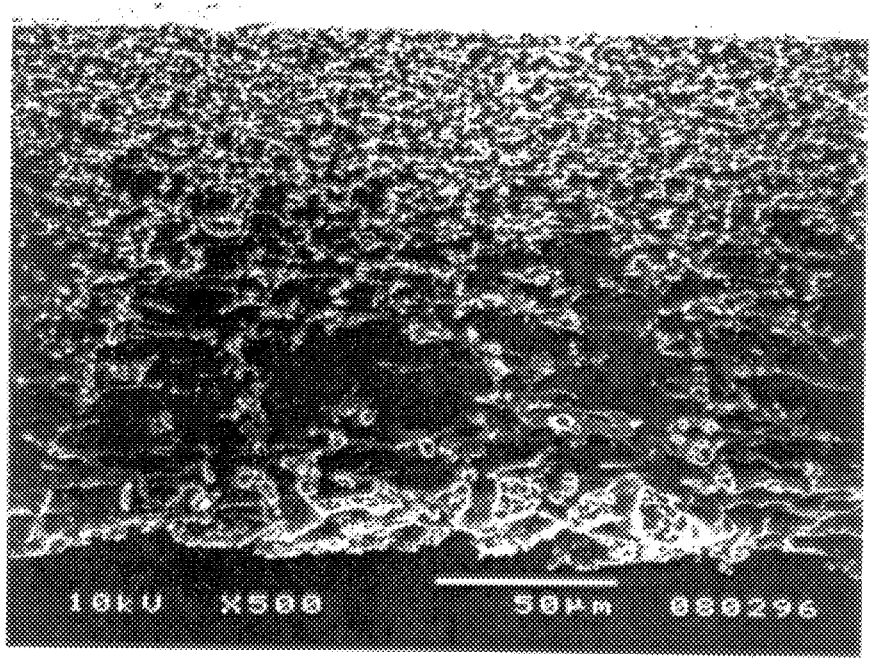

Figure 3
3a. Dull Surface @ Magnification = 1,000 X
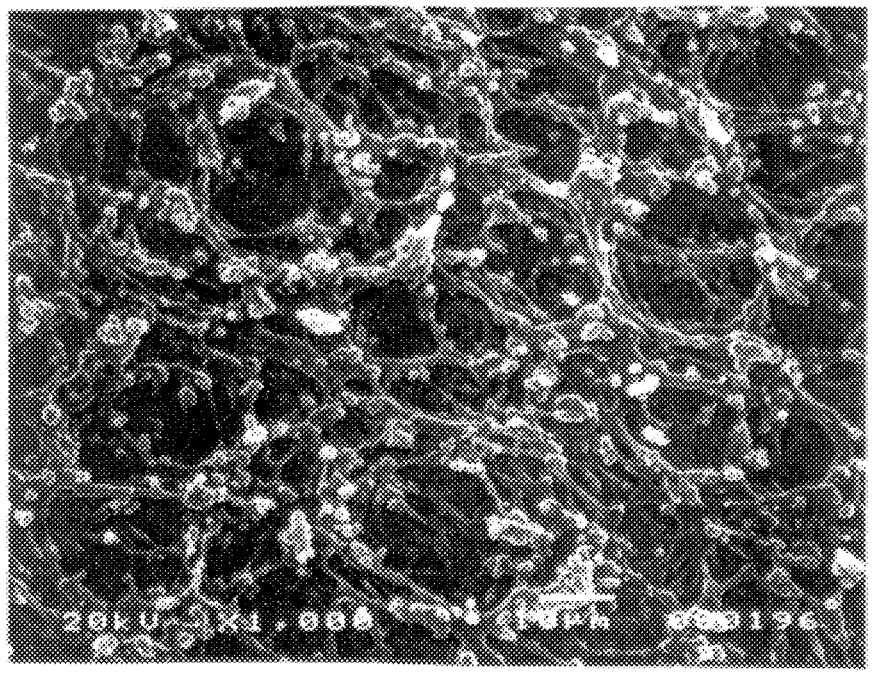
3b. Cross-section @ Magnification = 500 X
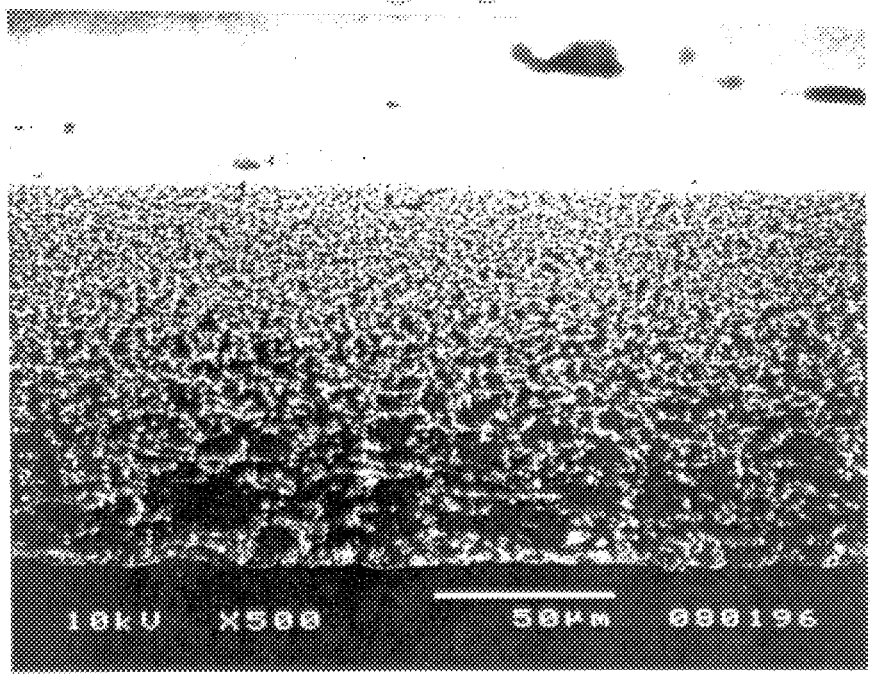

Cross-section@Magnification = 500 X

Cross-section@Magnification = 500 X

Cross-section@Magnification = 500 X

Cross-section @ Magnification = 500 X

HIGHLY ASYMMETRIC POLYETHERSULFONE FILTRATION MEMBRANES

BACKGROUND OF THE INVENTION

1. Field of the Invention

The present invention relates to filtration membranes. More specifically, the present invention relates to polyethersulfone filtration membranes that possess a highly asymmetric pore structure.

2. Background of the Technology

Many types of filtration membranes are available for filtering gases and liquids. Most polymeric membranes are generally made by first preparing a casting solution made up of the chosen polymer in a suitable solvent. The casting dope is then formed into a thin sheet and the polymer is precipitated into a solid phase. Precipitating the polymer into a solid membrane is normally carried out by evaporating the solvent or contacting the polymer with a non-solvent liquid in a quench bath. In many cases, the casting solution also includes a specific concentration of a non-solvent which can affect the porosity of the membrane Some filtration membranes have a layer of very small pores (termed herein a "skin") on one side, while other membranes do not contain this type of layer (termed herein "skinless"). A skinned membrane is created by quenching a polymeric casting solution of sufficient polymer concentration in a strong non-solvent. The resultant membrane has considerably smaller pores on the "skin" face than on the opposite face.

The casting conditions not only affect whether a skin is produced, but they can also determine the asymmetry of pores within the membrane. For example, a perfectly symmetrical membrane would have pores of the same diameter on both faces and throughout the support structure between the faces. However, a highly asymmetric membrane may have pores that change in diameter by 10,000:1 or more from one face to the other. Asymmetric microfiltration membranes are useful in many applications. For example, such membranes can be used for a variety of filtration applications for purification and testing in the food and beverage industry, water treatment, pharmaceuticals, and in medical laboratories. The membranes are useful in a variety of forms, including, for example, disks and cartridges. Such membranes have become increasingly relevant to the testing industry for uses as diverse as trace metals analysis and medical diagnostics.

Highly asymmetric membrane structures are disclosed in U.S. Pat. Nos. 4,629,563 (Re-examination Certificate No.: B1 4,629,563) and 4,774,039 to Wrasidlo. In these disclosures, the degree of asymmetry from the skin face to the opposite face within the support structure is gradual, rather than abrupt. This allows the membrane support structure to act as a prefilter (or more accurately, as several prefilters of different sizes), and enhances the life and dirt-holding capacity of the membrane by retaining particles that are much larger than the skin pores well before they come into proximity with the skin layer.

The manufacture of the Wrasidlo microfiltration membranes is based on the properties of an unstable dispersion of a membrane casting solution within the binodal or spinodal curves of a phase diagram. With an unstable casting solution, such as that described in Wrasidlo, the membranes are normally produced with constant agitation prior to casting. If the casting solution was not constantly agitated, the polymer-rich phase and polymer-poor phase would separate leading to an undesirable membrane, In addition, during unstable casting, special film exposure conditions are usually required. Furthermore, it is sometimes necessary to provide additional polymers in the casting solution or a heating step to induce the proper phase separation prior to the quenching step.

In addition, polysulfone membrane compositions based on the Wrasidlo patents do not stand up to repeated heating, such as by an autoclave, because they are made of polymers with low glass transition temperatures. Although others have experimented with various polymers in an attempt to overcome some of the disadvantages of prior membranes, they have met with limited success. For example, U.S. Pat. Nos.: 4,933,081 and 4,840,733 to Sasaki ("Sasaki Patents") disclose asymmetric polyethersulfone filtration membranes.

As is known, polyethersulfone can withstand heating and cooling procedures more readily than polysulfone. However, the methods disclosed in the Sasaki patents produce an hourglass-shaped membrane with maximum pore diameters on both surface faces and minimum pore diameters on the inside of the membrane. However, this type of membrane structure is, for many applications, not advantageous because of the internal location of the minimum pore. As disclosed in the Sasaki patents, the position of the minimum diameter pores within the membrane is related to the surface size of the pores. For example, as the layer of minimum pores is positioned deeper and deeper within the membrane, the pore diameters on the surface begin to get larger. For this reason, it is more difficult to manufacture a membrane with a particular external surface pore diameter.

In addition, to provide a 1000:1 asymmetry between the maximum and minimum pore diameters, the internal minimum pores must constrict 1000-fold from the exterior of the membrane to the middle of the membrane. The rapid constriction from the outer surface of the membrane to the inner pore can lead this type of membrane to have lower flow rates and clog more easily than a membrane with a more gradual slope from the largest pore diameter to the smallest pore diameter.

Accordingly, it would be desirable to provide a highly asymmetric polyethersulfone porous membrane having a high degree of water permeability, sufficient strength and rigidity, and that operates efficiently in separations and testing applications, wherein such a membrane could be produced from a more simplified casting process than the prior art.

SUMMARY OF THE INVENTION

One advantage of the membranes discussed herein is that they can be produced more efficiently than prior art membranes. It has been discovered that the membranes of the present invention can be produced with a simplified process that does not require employing a metastable casting solution.

Another advantage of the membranes disclosed herein is that they have higher temperature stability and chemical resistance than the polysulfone membranes disclosed in the prior art. By using polyethersulfone in place of polysulfone, the membranes have a glass transition temperature of 220° C. Membranes produced with polysulfone have a glass transition temperature of approximately 190° C. Thus, the polyethersulfone membranes disclosed herein can be repetitively steam sterilized without losing any integrity. In some cases, the polyethersulfone membranes can be steam sterilized more than 50 times. In addition, the polyethersulfone membranes can withstand treatment with various chemical solvents more readily than prior membranes.

The membranes of the invention are useful for, and exceptionally efficient in, separation and testing applications. In particular, the membranes of the invention are efficient in filtration of food products, including juices and other beverages. The membranes of the present invention are particularly well-suited for the wine and beer industry as clarification filters. Membranes with mean flow pore diameters of 0.45 microns are typically utilized for wine clarification, whereas membranes with mean flow pore diameters of typically 0.65 microns can be utilized for beer clarification.

The membranes of the invention can also be utilized in a variety of pharmaceutical applications as clarification prefilters and for sterile filtration. Membranes of the invention with mean flow pore diameters of about 0.45 microns are typically utilized in clarification applications, whereas membranes with mean flow pore diameters of 0.22 microns are typically utilized in sterile filtration applications.

Further, the membranes of the invention are highly effective in the filtration of water. A particularly useful application is the production of ultra-pure water for the electronic industry. Membranes of the invention with pore diameters of between about 0.05 and 0.20 microns are typically utilized for such applications.

The membranes of the present invention may be used with either the skin side or the support side of the membrane upstream with respect to fluid flow. It is preferred to use the membrane so that the support is upstream for microporous membranes. In this way, the reticulated porous support serves as a built-in prefilter, greatly increasing the dirt-holding capacity of the membrane. The fluid encounters the largest pores first and later encounters pores having gradually decreasing size with the smallest pores-those in the skin-being encountered last. Hence larger particles are retained before they reach the skin and do not clog its pores. An in-depth filtration is obtained in which the particles are retained at various levels leaving many more pores available for flow than if they were all retained in one plane at the skin. If the membrane is not highly asymmetric this advantage does not exist since approximately the same amount of retained matter fouls both sides of the membrane because the pore diameters on both sides are approximately the same.

The membranes of the present invention can be further post treated to improve their hydrophilicity and the resulting membranes can be utilized in food, pharmaceutical, biotechnology and water filtration applications as described above.

One embodiment of the invention is a highly asymmetric polymeric membrane having a first porous face and a second porous face, wherein the asymmetry between the pore diameters of the first porous face and the second porous face is at least 50:1, the polymeric membrane being produced by the steps of:

a) mixing a polyethersulfone polymer and a solvent into a polymer solution;

b) adding a non-solvent into the solution in an amount sufficient to produce a homogeneous dispersion;

c) exposing the solution to a gaseous environment; and d) precipitating a polyethersulfone membrane from the solution by quenching the dispersion with a non-solvent quenching liquid in which the solvent is soluble but the polymer is insoluble, the membrane including an asymmetric region of gradually increasing pore diameters, wherein the average diameter of pores on said second face is from about 50 to about 10000 times the diameter of said pores on said first face.

Another embodiment of the invention is a highly asymmetric polyethersulfone membrane having a first porous face and a second porous face, wherein the diameter of pores on the first face is at least fifty times greater than the diameter of pores on the second face, the polyethersulfone membrane further including a gradient of increasing pore diameters from said second porous face to said first porous face.

BRIEF DESCRIPTION OF THE DRAWINGS

FIG. 1, including FIGS. 1a and 1b, is a scanning electron microscope photomicrograph of a highly asymmetric polyethersulfone membrane. FIG. 1a shows the membrane skin surface taken at a magnification of 5000×. FIG. 1b shows the membrane in cross-section at a magnification of 500×.

FIG. 3, including FIGS. 3a and 3b, is a scanning electron microscope photomicrograph of a membrane produced by the method described in EXAMPLE 3. FIG. 3a shows the membrane dull side surface taken at a magnification of 1000×. FIG. 3b shows the membrane in cross-section taken at a magnification of 500×.

DETAILED DESCRIPTION

Figure 2:
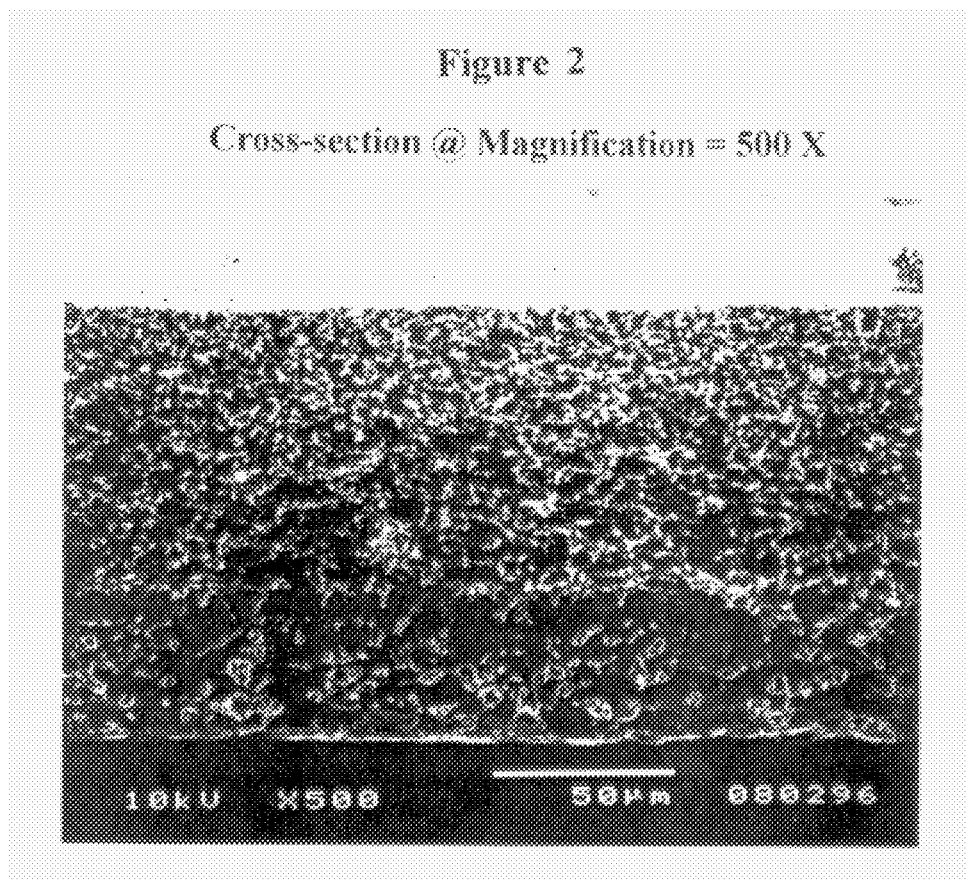
FIG. 2 a scanning electron microscope photomicrograph taken at a magnification of 500× of the cross-section of a membrane produced by the method described in EXAMPLE 2.

The present invention relates to highly asymmetric filtration membranes and their method of manufacture. In one embodiment, the highly asymmetric membranes are made with polyethersulfone. In one embodiment, the membranes are gradually asymmetric and include a skin layer of relatively small diameter pores disposed adjacent to a porous asymmetric support layer. The skin layer can include a high density of skin pores advantageously providing for a high flow rate. In one embodiment, the skin pores have an average diameter of from about 0.001 micron to about 20 microns. In addition, the membrane can include a porous support layer comprising a highly asymmetric region of gradually increasing pore diameters such that the average diameter of the pores on the opposite face of the membrane from the skin face is from about 50 to about 10000 times the diameter of the skin pores. Membranes in accordance with the invention possess porosities characteristic of ultrafiltration or microfiltration membranes.

In one embodiment of the present invention, membranes are prepared by providing a casting solution comprising between about 9% and 13% by weight of a polyethersulfone polymer, between about 20% and 80% by weight of a solvent and between about 10% and 70% by weight of a non-solvent. This casting solution is preferably a stable, clear homogeneous solution or stable colloidal dispersion. The casting solution is then cast to form a thin film and exposed to a gaseous environment, such as air for between about 0 second and 20 seconds. The thin film is then coagulated into a stable membrane by placing the thin film in a quench bath having a temperature between about 1° C. and 60° C.

I. Preparing Polyethersulfone Membranes

A. The Casting Process

In general, the overall method of preparing an asymmetric polyethersulfone membrane includes the steps of: providing a casting solution of between about 9% and 13% by weight of a polyethersulfone polymer, between about 20% and 80% by weight of a solvent and between about 10% and 70% by weight of a non-solvent, wherein said casting solution is a stable, clear, homogeneous solution or stable colloidal dispersion. That solution is then cast as a thin film. The thin film is then exposing to a gaseous environment for between about 0.1 second and 20 seconds. Once the casting solution has been exposed to the gaseous environment, it is coagulated in a quench bath having a temperature between about 1° C. and 60° C.

The membranes of the invention can be cast using any conventional procedure wherein the casting solution or dispersion is spread in a layer onto a nonporous support from which the membrane later can be separated after quenching. The membranes can be cast manually by being poured, cast, or spread by hand onto a casting surface followed by application of a quench liquid onto the casting surface. Alternatively, the membranes may be cast automatically by pouring or otherwise casting the solution onto a moving bed.

One type of moving belt support is polyethylene coated paper. In casting, particularly in automatic casting, mechanical spreaders can be used. Mechanical spreaders include spreading knives, a doctor blade or spray/pressurized systems. A preferred spreading device is an extrusion die or slot coater which has a chamber into which the casting formulation can be introduced. The casting solution is then forced out of the chamber under pressure through a narrow slot. Membranes may also be cast by means of a doctor blade with a knife gap of typically about 15 through about 50 mils, preferably about 16 through about 25 mils, and more preferably about 17 mils (425 microns). The relationship between the knife gap at casting and the final thickness of the membrane is a function of the composition and temperature of the casting solution, the duration of exposure to the gaseous environment, such as humid air, the relative humidity of the air during exposure. In addition, the temperature of the quench bath and many other factors can affect the overall thickness of the final membrane. Membranes typically shrink upon gelling, losing from about 20% to about 80% of their thickness. Casting solution or dispersion temperatures of between about 20° C. and 35° C. are typically utilized.

Generally, to produce a highly asymmetric membrane, the cast film should be exposed to a gaseous environment, such as air, sufficiently long to induce formation of relatively large surface pores. Another factor that is important to the manufacture of the membranes of the invention is the exposure time and exposure conditions that exist between casting and quenching the casting solution Preferably, the casting solution or dispersion is exposed to humid air after casting but before quenching. Ambient humidity is acceptable as are other humidity conditions. Relative air humidity is preferably greater than about 60%. In addition, the air is preferably circulated to enhance contact with the cast solution or dispersion.

The exposure time to air is generally from about 0.1 seconds to about 20 seconds. In some cases, exposure to the air is not necessary. Ultrafiltration membranes are typically produced with the methods described herein, but excluding exposure to air prior to quenching the casting solution. Increasing the air exposure time, over this range, tends to increase permeability of the resulting membrane. Most preferably, the air exposure time is 1 to 2 seconds.

Following casting and exposure to a gaseous environment, such as air, the cast dispersion or solution is quenched. In a preferred embodiment, quenching is accomplished by transporting the cast membrane on a moving belt into the quenching liquid, such as a water bath. Most commonly, the quenching liquid is water. In the quench bath, the polymer precipitates or coagulates and can produce a microporous skin having the requisite pore diameters and a support region having the desired structure. The resulting membrane is ordinarily washed free of solvent and may be dried to expel additional increments of solvent, diluent, and quench liquid.

The temperature of the quench bath can affect the porosity of the membrane. In general, warmer quench baths result in more porous membranes. Generally, a wide temperature range can be utilized in the quenching step, ranging from about 1° C. to about 60° C. The lower temperature limit is determined by the freezing point of the particular quench liquid. Preferably, the quench liquid is water and the quenching temperature is between about 27° C. (or room temperature or slightly above room temperature) and about 40° C. The temperature of the quench bath appears to cause marked changes in the pore diameters of the microporous skin of the membrane and also in its asymmetry. Where higher quench temperatures are utilized, the membranes possess both larger skin pores and enhanced asymmetry. Conversely, where lower temperatures are utilized, smaller pores form and asymmetry can be reduced.

Membranes are recovered from the quench bath in the conventional manner involving physical removal, washing with deionized water and oven or air drying. Membranes produced by the methods described above may be 50 to 1000 microns thick, or more. Preferably, the thickness of the membrane is about 75 to 200 microns. More preferably, the membrane thickness is about 90 to 150 microns. It is well known that several parameters such as polymer solution viscosity, polymer solution flow rate from the casting knife, membrane support belt speed, environmental and quenching conditions, and the like affect the final membrane thickness. These can all be adjusted to achieve the desired membrane.

The overall properties for the asymmetric polyethersulfone membranes of the present invention may also be varied by varying parameters, such as polymer concentration, solvent and non-solvent nature and concentration, relative degree of homogeneity or stability of the casting solution, exposure time to a gaseous environment following casting, quenching liquid and temperature and other variables as described below.

B. Casting Solutions

Highly asymmetric polyethersulfone membranes are preferably prepared from stable, clear homogeneous solutions as well as stable colloidal dispersions. The stable, clear homogeneous solutions can be prepared through the use of solvents alone, or in combination with non-solvents. Membranes prepared from colloidal dispersions can be formed with bubble points in the same general range as those made from homogeneous solutions.

Membranes are generally prepared from a casting solution or dispersion of a polyethersulfone polymer along with particular concentrations of polymer solvents and non-solvents. The concentration of the polyethersulfone polymer in the casting solution should be low enough to form a substantially all-reticulated structure within the asymmetric support, but high enough to still produce a coherent membrane. If the polyethersulfone concentration is too low, the resulting membrane would have no coherency and, in the extreme case, only dust would be formed. If the polyethersulfone concentration is too high, the membrane structure within the asymmetric support would not be substantially reticulated and would contain at least some granulated structures.

Although the appropriate concentration of polyethersulfone varies somewhat depending upon the particular conditions used, (e.g., solvents, etc.), the polymer concentration should generally be from about 9% to about 13%. Typically, the casting solution contains from about 10% to about 12% polyethersulfone, put preferably the casting solution includes about 11% polyethersulfone.

A number of polyethersulfone polymers are available and can be used within embodiments of the invention. For example, one type of polyethersulfone polymer is E-6020P, manufactured by BASF Corporation. Other polyethersulfone polymers may also be employed in the presently claimed invention such as Radel A-100 or Radel A-200 or Radel A-300 (Amoco Corporation). There is no particular molecular weight range limitation for polyethersulfone polymers which can be utilized.

Other factors, such as the polyethersulfone concentration, solvent selection and concentration and non-solvent selection and concentration contribute to making the desired stable, clear homogeneous solution or stable colloidal dispersion. Although the following describes some of the materials which have been found useful in the practice of this invention, but it will be clear to those skilled in the art that many others and/or their combinations may also be used.

The preparation of stable, clear homogeneous solutions or stable colloidal dispersions of membrane casting solutions involve well-known principles of polymer solubility. Polymer solvents may be categorized as "good" solvents, non-solvents, and "poor" (or "ideal") solvents. "Good" solvents are those in which the interactions (forces) between the polymer molecules and solvent molecules are greater than the forces of attraction between one polymer molecule and another polymer molecule. The reverse is true for non-solvents. "Ideal" or "poor" solvents are those in which the interactions between the polymer and solvent are equal to the forces of attraction between one polymer and another polymer molecule.

Good solvents dissolve substantial amounts of polymer and may be miscible with the polymer, whereas poor solvents may or may not be miscible, depending upon the molecular weight of the polymer the type of solvent.

It has been found that a stable, clear homogeneous casting solution or stable colloidal dispersion can be obtained by first dissolving polyethersulfone in a good solvent such as N-methylpyrrolidone or dimethylformamide. Examples of other solvents that may be used to produce membranes according to this invention include: dimethylacetamide, dioxane, dimethylsulfoxide, chloroform, tetramethylurea and tetrachloroethane. The amount of solvent which may be employed to prepare an asymmetric polyethersulfone membrane is between about 20% and about 80% by weight of the casting solution. Preferably, the amount of solvent used is between about 29% and about 70% by weight of the casting solution. Most preferably, the precise amount of solvent to be used is determined by the particular casting solution, including the particular polyethersulfone polymer, non-solvent and the other conditions of the method of preparation of the particular membrane of interest.

Once the polyethersulfone is dissolved in a solvent, a small amount of non-solvent is titrated in just prior to or up to first turbidity. Examples of appropriate non-solvents include: 2-methoxyethanol, propionic acid, t-amyl alcohol, methanol, ethanol, isopropanol, hexanol, heptanol, octanol, acetone, methylethylketone, methylisobutylketone, butyl ether, ethyl acetate amyl acetate, glycerol, diethyleneglycol, di(ehtyleneglycol)diethylether, di(ethyleneglycol) dibutylether, and water. The amount of non-solvent which may be employed to prepare an asymmetric polyethersulfone membrane is between about 10% and about 70% by weight of the casting solution. Preferably, the amount of non-solvent used is between about 19% and about 62% by weight of the casting solution. Most preferably, the precise amount of non-solvent to be used is determined by the particular casting solution, including particular polyethersulfone polymer, solvent and the other conditions of the method of preparation of the particular membrane of interest.

Once the polyethersulfone, solvent and non-solvent are mixed, the casting solution should be either clear, or if dispersions, have an optical density of less than about 0.5 at 420 nanometers with a 2 centimeter light path. The stable, clear homogeneous solution or stable colloidal dispersion of polyethersulfone in the casting solutions are advantageous because they will not normally separate into two or more segregated liquid phases for a period of at least one or more days at room temperature. Thus, constant agitation is not required to prevent the solvent and non-solvent phases from separating. The casting solutions described above have been found to be stable for several weeks or more at room temperature, especially those containing 2-methoxyethanol as a non-solvent.

In addition to the requirement of a stable polymer-solvent-non-solvent casting solution, the relationship of these components to the quench liquid is also important. The polymer must, of course, be insoluble in the quench liquid, and the solvent should be soluble in the quench liquid (and vice versa). In fact, it is also preferred that the solvent and quench liquid be completely miscible with each other under membrane formation conditions. Water is the generally preferred quench liquid for economic and environmental reasons. It is also preferred that the solvent have a low viscosity. If the solvent has a low viscosity and the solvent and quench liquid are completely soluble in one another, rapid diffusion of the quench liquid into the casting solution is assured.

The non-solvent should have only limited solubility in the quench liquid. In making ultra-filters, it is preferred that the non-solvent be substantially completely non-miscible with the quench liquid. This limited solubility is believed to be effective in increasing the asymmetry of the resulting membrane.

The formation of membranes having larger pores (above about 0.2 microns) may be accomplished in various ways, but for convenience, the process by which these large pore membranes are produced is preferably facilitated by increasing the proportion of non-solvent in the casting solution. At constant homogeneity or colloidal dispersion stability, the amount of non-solvent that may be added to the system without causing prompt segregation of phases is higher at higher temperatures unless a non-solvent with reverse thermal gelation properties is employed. Such non-solvents with reverse thermal gelation properties include 2-methoxyethanol.

C. Membrane Architecture

Preferred membranes relating to this invention are made from polyethersulfone (PES) and have highly asymmetric regions of gradually increasing pore diameters. On one side of the PES membrane is a skin face having relatively small diameter pores while the opposite face of the membrane has relatively large diameter pores. The difference in porosity between the skin face and the opposite face is preferably at least between 50:1 to 10,000:1. More preferably, the difference in porosity is between 200:1 and 1000:1. In addition, membranes made by methods disclosed herein have a gradual slope of pore size from the skin face to the opposite face. Thus, during filtration, larger particles can enter the membrane through the larger pores, but do not exit through the smaller pores. Because the larger particles do become lodged at the outer surface, the membranes made by the methods disclosed herein are not easily clogged with large particles.

A convenient method for assessing the asymmetry and pore diameter of membranes is through the use of scanning electron microscopy (SEM). FIG. 1a is a SEM photograph illustrating the porous skin surface of a membrane made by the methods described herein. FIG. 1b is a cross-section of the same membrane. The skin pores of the membranes may advantageously have an average diameter from about 0.001 micron to about 20 microns. In general, the average diameter of the skin pore is greater than about 0.05 $\mu$m, and typically is greater than 0.1 $\mu$m.

Pore diameter can also be estimated by porometry analysis and by separate measurement of the bubble point, with a higher bubble point indicating tighter pores. Porometry consists of applying gradually increasing pressures on a wet membrane and comparing gas flow rates with those of the dry membrane which yields data on pore diameters as well as the bubble point. For these analyses, a Coulter Porometer Model 0204 was used. Porometry measurements give the "mean flow pore diameter" of the membrane. The mean flow pore diameter is the average size of the limiting pores in a membrane. A proper judgment of the size of pores in a highly asymmetric membrane includes consideration not only of the average skin pore diameter as determined from SEM, but also includes consideration of the mean flow pore diameter as determined from porometry testing.

The mean flow pore diameter is based on the pressure at which air flow begins through a pre-wetted membrane (the bubble point pressure) compared to the pressure at which the air flow rate through a pre-wetted membrane is half the air flow rate through the same membrane when dry (the mean flow pore pressure). The bubble point pressure indicates the size of the largest limiting pores, and the mean flow pore pressure indicates the mean size of the limiting pores. Accordingly, by comparing these two values, one can determine not only the average size of the limiting pores in a membrane, but can also determine the uniformity of limiting pore diameters. As demonstrated below, membranes produced by the methods disclosed herein have a much higher uniformity of pore diameter than other membranes with large pore diameters.

Membranes in accordance with the invention thus possess porosities characteristic of ultrafiltration or microfiltration membranes. Suitable membranes of the present invention within the ultrafiltration range preferably possess molecular weight cutoffs of from about 10,000 daltons to about 100,000 daltons and have pore diameters from about 0.001 $\mu$m to about 0.050 $\mu$m. In contrast, microfiltration membranes typically possess pore diameters of at least 0.05 $\mu$m to about 20 $\mu$m. The membranes described herein were found to be substantially free of macrovoids. As is known, macrovoids are finger-like voids within the membrane that materially vary in size from the surrounding porosity. In addition, the membranes typically have a bulk porosity, or void volume, of greater than about 60%. The membranes of the present invention also have a substantially larger dirt-holding capacity in one flow direction than the other, due to the highly asymmetric structure of the pore diameters.

The following examples are provided by way of illustration only and are not intended as a limitation of the present invention, many variations of which are possible without departing from the spirit and scope thereof. All parts and percentages in the examples and claims are by weight unless otherwise specified.

EXAMPLE 1

A stable, clear, homogeneous casting solution was prepared containing, by weight, 10% of polyethersulfone (E-6020P manufactured by BASF), 60% 2-methoxyethanol as the non-solvent, and 30% N-methylpyrrolidone (NMP) as the solvent. Membrane samples were cast onto a moving belt of polyethylene coated paper using a casting knife with a knife gap of 17 mils (425 $\mu$m). Following casting, the membranes were exposed to air for two seconds and were quenched in a water bath of about 400° C.

After coagulation, the membranes were washed with deionized water and then air dried. The recovered membranes had a thickness of between 100 to 110 $\mu$m. Each of the membranes was tested for water permeability at 10-psig on a 47-mm diameter disc (approximately 9.5 cm$^2$). SEM photos (FIGS. 1a,1b) show a highly asymmetric membrane structure. The resulting membrane had Mean Flow Pore (MFP) size of 1.5 $\mu$m analyzed by Coulter Porometer. The results of this experiment are listed in Table 1.

EXAMPLE 2

A stable, slightly opaque, colloidal dispersion casting solution was prepared containing, by weight, 11% of polyethersulfone (E-6020P manufactured by BASF), 61% 2-methoxyethanol as the non-solvent, and 29% N-methylpyrrolidone (NMP) as the solvent. Membrane samples were cast onto a moving belt of polyethylene coated paper using a casting knife with a knife gap of 17 mils (425 $\mu$m). Following casting, the membranes were exposed to air for two seconds and were quenched in a water bath of about 40° C.

After coagulation, the membranes were washed with deionized water and then air dried. The recovered membranes had a thickness of between 100 to 120 $\mu$m. Each of the membranes was tested for water permeability at 10-psig on a 47-mm diameter disc (approximately 9.5 cm$^2$). An SEM photo (FIG. 2) shows a highly asymmetric membrane structure. The resulting membrane had Mean Flow Pore (MFP) size of 1.2 $\mu$m analyzed by Coulter Porometer. The results of this experiment are listed in Table 1.

EXAMPLE 3

A stable, clear, homogeneous casting solution was prepared the same as EXAMPLE 1 except following casting, the membranes were exposed to air for two seconds and were quenched in a water bath of about 27° C. After coagulation, the membranes were washed with deionized water and then air dried. The recovered membranes had a thickness of between 120 to 130 μm. Each of the membranes was tested for water permeability at 10-psig on a 47-mm diameter disc (approximately 9.5 cm$^2$). SEM photos (FIGS. 3a, 3b) show an asymmetric membrane structure. The resulting membrane had Mean Flow Pore (MFP) size of 0.5 μm analyzed by Coulter Porometer vs. 1.46 μm of EXAMPLE 1. The results of this experiment are listed in Table 1.

EXAMPLE 4

A stable, clear, homogeneous casting solution was prepared containing, by weight, 11% of polyethersulfone (E-6020P manufactured by BASF), 42% propionic acid as the non-solvent, and 47% N-methylpyrrollidone (NMP) as the solvent. Membrane samples were cast onto a moving belt of polyethylene coated paper using a casting knife with a knife gap of 17 mils (425 μm). Following casting, the membranes were exposed to air for one second and were quenched in a water bath of about 40° C.

Figure 4:
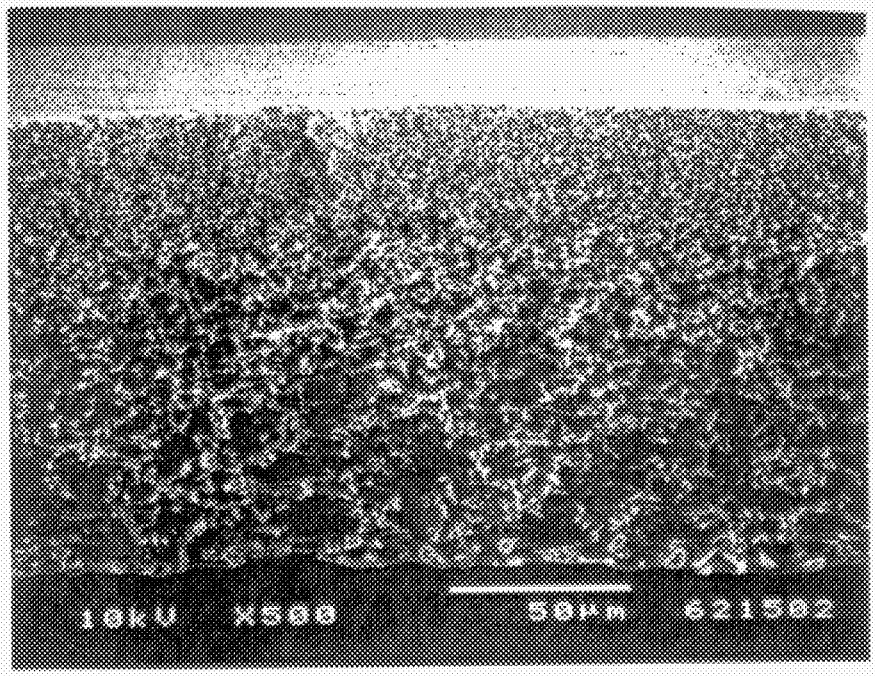
FIG. 4 is a scanning electron microscope photomicrograph taken at a magnification of 500× of the cross-section of a membrane produced by the method described in EXAMPLE 4.

After coagulation, the membranes were washed with deionized water and then air dried. The recovered membranes had a thickness of between 120 to 130 μm. Each of the membranes was tested for water permeability at 10-psig on a 47-mm diameter disc (approximately 9.5 cm$^2$). An SEM photo (FIG. 4) shows a highly asymmetric membrane structure. The resulting membrane had Mean Flow Pore (MFP) size of 0.47 μm analyzed by Coulter Porometer. The results of this experiment are listed in Table 1.

EXAMPLE 5

A stable, clear, homogeneous casting solution was prepared containing, by weight, 10.7% of polyethersulfone (E-6020P manufactured by BASF), 43.6% propionic acid as the non-solvent, and 45.7% N-methylpyrrollidone (NMP) as the solvent. Membrane samples were cast onto a moving belt of polyethylene coated paper using a casting knife with a knife gap of 17 mils (425 μm). Following casting, the membranes were exposed to air for one second and were quenched in a water bath of about 40° C.

Figure 5:
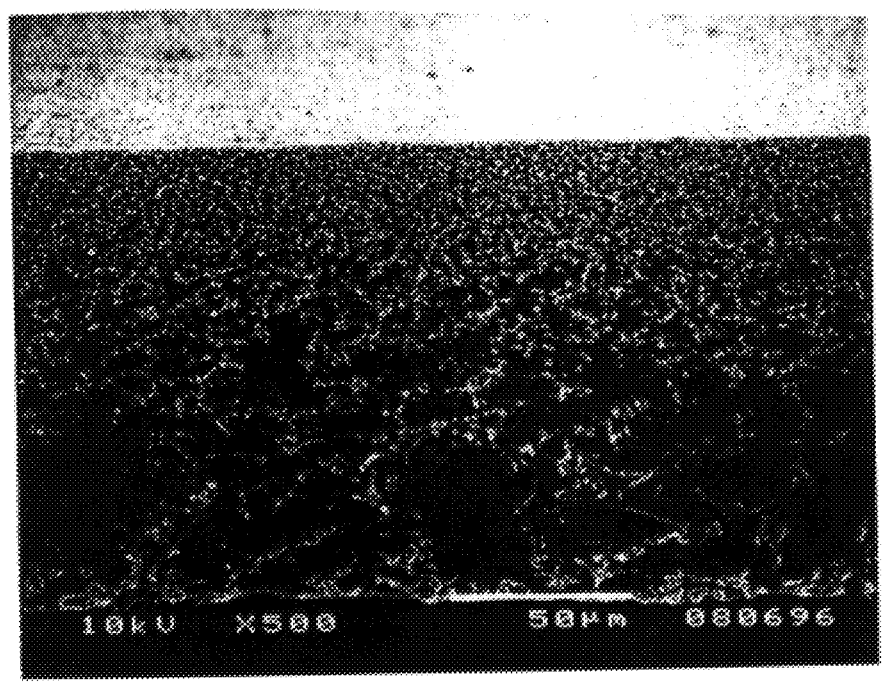
FIG. 5 is scanning electron microscope photomicrograph taken at a magnification of 500× of the cross-section of a membrane produced by the method described in EXAMPLE 5.

After coagulation, the membranes were washed with deionized water and then air dried. The recovered membranes had a thickness of between 100 to 120 μm. Each of the membranes was tested for water permeability at 10-psig on a 47-mm diameter disc (approximately 9.5 cm$^2$). An SEM photo (FIG. 5) shows a highly asymmetric membrane structure. The resulting membrane had Mean Flow Pore (MFP) size of 0.24 μm analyzed by Coulter Porometer. The results of this experiment are listed in Table 1.

EXAMPLE 6

A stable, clear homogeneous casting solution was prepared containing, by weight, 11% of polyethersulfone (E-6020P manufactured by BASF), 61% 2-methoxyethanol as the non-solvent, and 29% N-methylpyrrollidone (NMP) as the solvent. Membrane samples were cast onto a moving belt of polyethylene coated paper using a casting knife with a knife gap of 17 mils (425 μm). Following casting, the membranes were exposed to air for one second and were quenched in a water bath of about 40° C.

Figure 6:
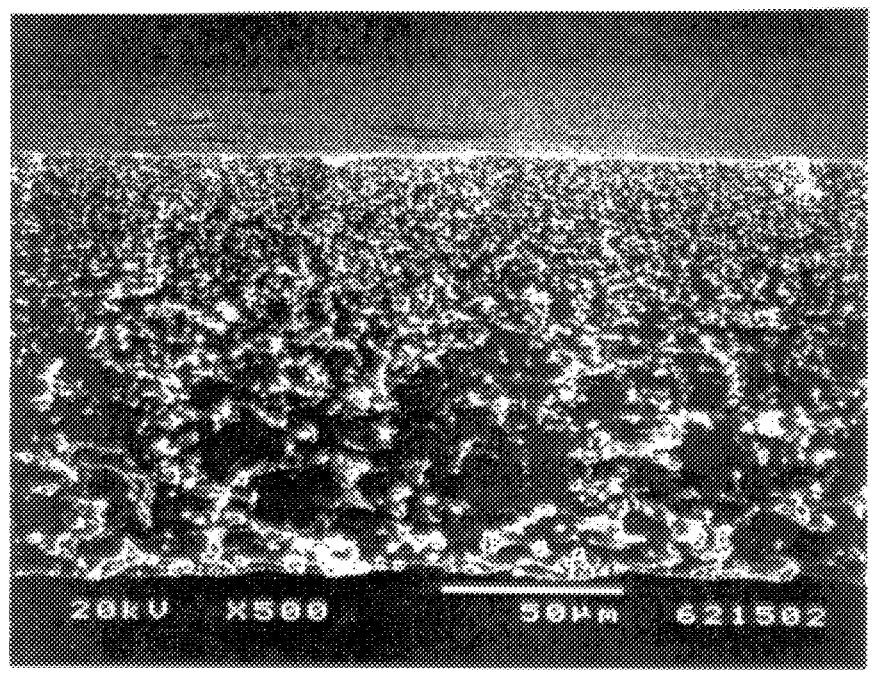
FIG. 6 is a scanning electron microscope photomicrograph taken at a magnification of 500× of the cross-section of a membrane produced by the method described in EXAMPLE 6.

After coagulation, the membranes were washed with deionized water and then air dried. The recovered membranes had a thickness of between 110 to 120 μm. Each of the membranes was tested for water permeability at 10-psig on a 47-mm diameter disc (approximately 9.5 cm$^2$). An SEM photo (FIG. 6) shows a highly asymmetric membrane structure. The resulting membrane had Mean Flow Pore (MFP) size of 0.24 μm analyzed by Coulter Porometer. The results of this experiment are listed in Table 1.

EXAMPLE 7

A stable, clear, homogeneous casting solution was prepared containing, by weight, 9.6% of polyethersulfone (E-6020P manufactured by BASF), 61.6% 2-methoxyethanol as the non-solvent, and 28.8% N-methylpyrrollidone (NMP) as the solvent. Membrane samples were cast onto a moving belt of polyethylene coated paper using a casting knife with a knife gap of 17 mils (425 μm). Following casting, the membranes were exposed to air for one to two seconds and were quenched in a water bath of about 27° C.

Figure 7:
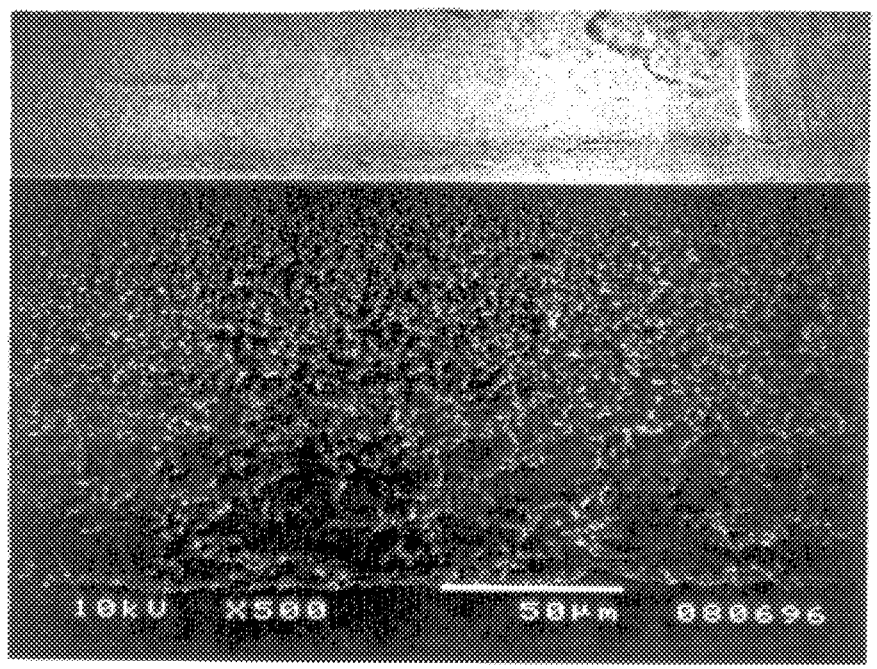
FIG. 7 is a scanning electron microscope photomicrograph taken at a magnification of 500× of the cross-section of a membrane produced by the method described in EXAMPLE 7.

After coagulation, the membranes were washed with deionized water and then air dried. The recovered membranes had a thickness of between 110 to 130 μm. Each of the membranes was tested for water permeability at 10-psig on a 47-mm diameter disc (approximately 9.5 cm$^2$). An SEM photo (FIG. 7) shows a highly asymmetric membrane structure. The resulting membrane had Mean Flow Pore (MFP) size of 0.11 μm analyzed by Coulter Porometer. The results of this experiment are listed in Table 1.

TABLE 1

Characterization of Polyethersulfone Microfiltration Membranes

| Example # | Water Flow Rate (ml/min) | Testing Pressure (psi) | Maximum Pore diameter (μm) | MFP Size (μm) | Minimum Pore diameter (um) | SEM Photo # |
|---|---|---|---|---|---|---|
| 1 | 2,000 | 10 | 1.69 | 1.46 | 1.23 | 1a, 1b |
| 2 | 1,300 | 10 | 1.38 | 1.21 | 0.88 | 2 |
| 3 | 480 | 10 | 0.6 | 0.5 | 0.23 | 3a, 3b |
| 4 | 660 | 10 | 0.65 | 0.47 | 0.36 | 4 |
| 5 | 390 | 10 | 0.37 | 0.24 | 0.19 | 5 |
| 6 | 500 | 10 | 0.45 | 0.24 | 0.17 | 6 |
| 7 | 300 | 10 | 0.13 | 0.11 | 0.1 | 7 |

The results presented in Table 1 report that the mean flow pore diameter (MFP) increases in membranes that are created with similar casting solutions but increasing waterbath quenching temperatures. For example, the waterbath quench temperature used in EXAMPLES 1 and 2 was 40° C. while the waterbath quench temperature used in EXAMPLE 3 was 27° C. As shown in Table 1, membranes produced by the method of EXAMPLE 3 have a MFP diameter of 0.5 microns, whereas membranes produced by the methods of EXAMPLES 1 and 2 have MFP diameters of 1.46 microns and 1.21 microns, respectively. Similar results are seen in comparing EXAMPLES 6 and 7 wherein higher quench bath temperature led to production of membranes having larger MFP diameters. The mean flow pore diameter of membranes produced by the method of EXAMPLE 7 was 0.11 microns while membranes produced by the method of EXAMPLE 6 was 0.24 microns.

In comparing the results of EXAMPLES 4, 5 and 6, it can be seen that each of these examples produces membranes from casting solutions that have essentially equivalent polyethersulfone concentrations (11, 10.7 and 11% respectively). In addition, these examples employed similar exposures times to air (one second), similar water bath quenching temperatures (40° C.), but different non-solvents and concentrations of both non-solvents and solvents.

In EXAMPLES 4 and 5, propionic acid was introduced as a non-solvent (42% and 43.6% respectively) and N-methylpyrrolidone was introduced as a solvent (47% and 45.7% respectively). In EXAMPLE 6, the casting solution included 61% 2-methoxyethanol as a non-solvent and 29% N-methylpyrrolidone as a solvent. In contrast to 2-methoxyethanol, which exhibits reverse thermal gelation properties, propionic acid is a non-solvent with normal thermal gelation properties. Despite these fundamental differences, the membrane pore diameters and pore diameter distribution of these three membranes were all very similar. This indicates that membranes made by the methods described herein does not rely upon reverse thermal gelation non-solvents to achieve a particular pore diameter and asymmetry.

In comparing EXAMPLE 2 with EXAMPLE. 6, it can be seen that all of the casting parameters were the same, except that the membrane was exposed to air for 2 seconds in EXAMPLE 2 and one second in EXAMPLE 6. As reported in Table 1, the membranes produced by the methods of EXAMPLE 2 (two second air exposure) have a greater mean flow pore diameter.

EXAMPLE 8

A casting solution was prepared containing, by weight, 10.46% of polyethersulfone (E-6020P manufactured by BASF), 69.72% dimethyl formamide (DMF) as the solvent, and 19.82% t-amyl alcohol as the non-solvent. Membrane samples were cast onto a moving belt of polyethylene coated paper using a casting knife with a knife gap of 24 mils. Following casting, the membranes were exposed to air two seconds and were quenched in a water bath of about 33° C.

Figure 8:
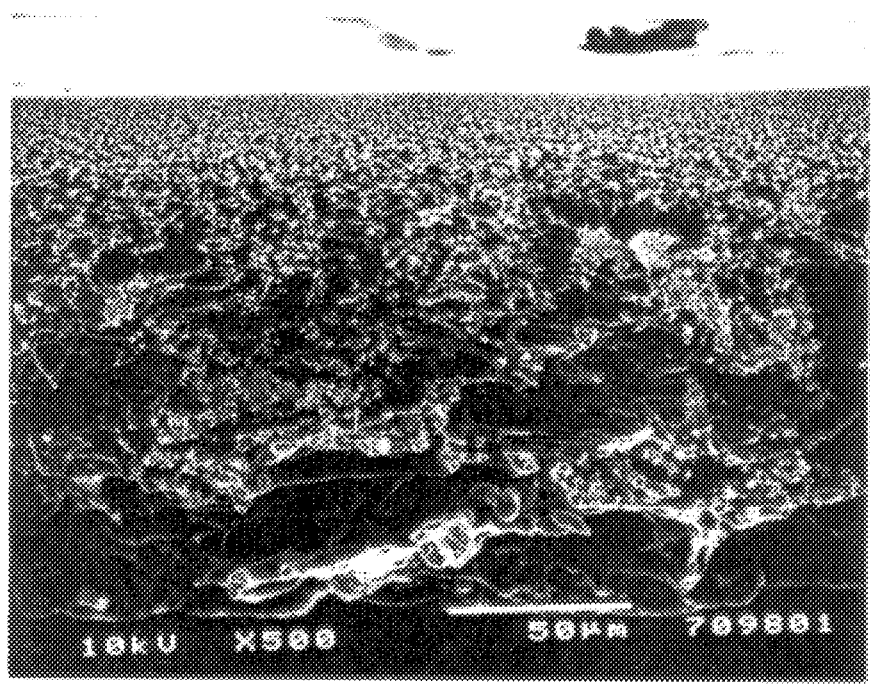
FIG. 8 is a scanning electron microscope photomicrograph taken at a magnification of 500× of the cross-section of a membrane produced by the method described in EXAMPLE 8.

After coagulation, the membranes were washed with deionized water and then oven dried. The recovered membranes had thickness of between 110 to $\mu$m. Each of membranes were tested for water permeability at 10-psig on a 47-mm diameter disc (approximately 9.5 cm$^2$). An SEM photo (FIG. 8) shows a highly asymmetric membrane structure. The resulting membrane had Mean Flow Pore (MFP) side of 0.2 $\mu$m analyzed by Coulter Porometer. The results of this experiment are listed in Table 2.

EXAMPLE 9

A casting solution was prepared containing by weight, 10.5% of polyethersulfone (E-6020P manufactured by BASF), 70% DMF as the solvent, and 19.5% t-amyl alcohol as the non-solvent. Membrane samples were cast onto a moving belt of polyethylene coated paper using a casting knife with a knife gap of 20 mils. Following casting, the membranes were exposed to air for one to two seconds and were quenched in a water bath of about 27° C.

After coagulation, the membranes were washed with deionized water then air dried. The recovered membranes had thickness of between 110 to 130 $\mu$m. Each of membranes were tested for water permeability at 10-psig on a 47-mm diameter disc (approximately 9.5 cm$^2$). SEM photos (not shown) show an highly asymmetric membrane structure. The resulting membrane had a Mean Flow Pore (MFP) size of 0.1 $\mu$m analyzed by Coulter Porometer. The results of this experiment are listed in Table 2.

TABLE 2

Characterization of Polyethersulfone Microfiltration Membranes from EXAMPLES 8 and 9

| Example # | Water Flow Rate (ml/min) | Testing Pressure (psi) | Maximum Pore Size (um) | MFP Size (um) | Minimum Pore Size (um) | SEM Photo # |
|---|---|---|---|---|---|---|
| 8 | 364 | 10 | 0.26 | 0.19 | 0.16 | 8 |
| 9 | 333 | 10 | 0.15 | 0.1 | 0.08 | |

The results presented in Tables 1 and 2 illustrate that a variety of polyethersulfone polymer concentrations, non-solvents, solvents and casting, exposing and quenching conditions can be employed according to the method of the present invention to produce advantageous highly asymmetric membranes.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing descriptions. All changes which come within the meaning and range of equivalency of the claims are to be embraced within their scope.

What is claimed is:

1. A highly asymmetric polymeric membrane having a first porous face and a second porous face, wherein the asymmetry between the pore diameters of said first porous face and said second porous face is at least 50:1, said polymeric membrane being produced by the steps of:
   a) mixing a polyethersulfone polymer and a solvent into a polymer solution;
   b) adding a non-solvent into said solution in an amount sufficient to produce a homogeneous dispersion;
   c) exposing said solution to a gaseous environment; and
   d) precipitating a polyethersulfone membrane from said solution by quenching said dispersion with a non-solvent quenching liquid in which the solvent is soluble but said polymer is insoluble, said membrane further comprising an asymmetric region of gradually increasing pore diameters, wherein the average diameter of pores on said second face is from about 50 to about 10000 times the diameter of said pores on said first face.

2. The membrane of claim 1, wherein said first porous face comprises pores having an average diameter of from about 0.001 micron to about 20 microns.

3. The membrane of claim 1, wherein said polymeric membrane comprises a mean flow pore diameter of from about 0.05 $\mu$m to about 2 $\mu$m.

4. The membrane of claim 1, wherein said membrane is at least about 50 $\mu$m in thickness.

5. The membrane of claim 1, wherein said solvent is selected from the group consisting of: N-methylpyrrolidone, dimethylformamide, dimethylacetamide, dioxane, dimethylsulfoxide, chloroform, tetramethylurea and tetrachloroethane.

6. The membrane of claim 1, wherein said non-solvent is selected from the group consisting of: 2-methoxyethanol, propionic acid, t-amyl alcohol, methanol, ethanol, isopropanol, hexanol, heptanol, octanol, propane, hexane, heptane, octane, acetone, methylethylketone, methylisobutylketone, nitropropane, butyl ether, ethyl acetate and amyl acetate.

7. The membrane of claim 1, wherein said gaseous environment is air.

8. The membrane of claim 1, wherein said non-solvent quench liquid is water.

9. The membrane of claim 1, wherein said membrane has a bulk porosity greater than 60 percent.

10. The membrane of claim 1, wherein said polymer solution comprises between about 9% and 13% by weight of a said polyethersulfone polymer.

11. The membrane of claim 1, wherein said polymer solution comprises between about 20% and 80% by weight of solvent.

12. A method of making a highly asymmetric polyethersulfone membrane having a first porous face and a second porous face, wherein the asymmetry between the pore diameters of said first porous face and said second porous face is at least 50:1, comprising the steps of:
   a) mixing a polyethersulfone polymer and a solvent into a polymer solution;
   b) adding a non-solvent into said solution in an amount sufficient to produce a homogeneous dispersion;
   c) exposing said solution to a gaseous environment; and
   d) precipitating a polyethersulfone membrane from said solution by quenching said dispersion with a non-solvent quenching liquid in which the solvent is soluble but said polymer is insoluble, said membrane comprises an asymmetric region of gradually increasing pore diameters, wherein the average diameter of pores on said second face is from about 50 to about 10000 times the diameter of said pores on said first face.

13. The membrane of claim 12, wherein said first porous face comprises pores having an average diameter of from about 0.001 micron to about 20 microns.

14. The membrane of claim 12, wherein said polymeric membrane comprises a mean flow pore diameter of from about 0.05 $\mu$m to about 2 $\mu$m.

15. The membrane of claim 12, wherein said membrane is at least about 50 $\mu$m in thickness.

16. The membrane of claim 12, wherein said solvent is selected from the group consisting of: N-methylpyrrolidone, dimethylformamide, dimethylacetamide, dioxane, dimethylsulfoxide, chloroform, tetramethylurea and tetrachloroethane.

17. The membrane of claim 12, wherein said non-solvent is selected from the group consisting of: 2-methoxyethanol, propionic acid, t-amyl alcohol, methanol, ethanol, isopropanol, hexanol, heptanol, octanol, propane, hexane, heptane, octane, acetone, methylethylketone, methylisobutylketone, nitropropane, butyl ether, ethyl acetate and amyl acetate.

18. The membrane of claim 12, wherein said gaseous environment is air.

19. The membrane of claim 12, wherein said non-solvent quench liquid is water.

20. The membrane of claim 12, wherein said membrane has a bulk porosity greater than 60 percent.

21. The membrane of claim 12, wherein said polymer solution comprises between about 9% and 13% by weight of a said polyethersulfone polymer.

22. The membrane of claim 12, wherein said polymer solution comprises between about 20% and 80% by weight of solvent.

* * * * *